United States Patent [19]

Horst

[11] Patent Number: 4,905,435

[45] Date of Patent: Mar. 6, 1990

[54] PANE HOLDER IN ALL-GLASS FACADES

[75] Inventor: Günter Horst, Lüdenscheid, Fed. Rep. of Germany

[73] Assignee: Eduard Hueck, Lüdenscheid, Fed. Rep. of Germany

[21] Appl. No.: 258,042

[22] Filed: Oct. 13, 1988

Related U.S. Application Data

[63] Continuation of Ser. No. 75,119, Jul. 20, 1987, abandoned.

[30] Foreign Application Priority Data

Jul. 19, 1986 [DE] Fed. Rep. of Germany ....... 3624491

[51] Int. Cl.$^4$ .............................................. E04B 2/88
[52] U.S. Cl. ....................................... 52/235; 52/400; 52/401
[58] Field of Search ................. 52/235, 468, 467, 398, 52/399, 400, 401, 466

[56] References Cited

U.S. PATENT DOCUMENTS

| 2,034,725 | 3/1936 | MacGaffey | 52/399 |
| 3,343,317 | 9/1967 | Cripe | 52/398 |
| 3,534,501 | 10/1970 | Carlsson | 52/788 |
| 4,015,390 | 4/1977 | Howorth | 52/235 |
| 4,041,663 | 8/1977 | Mazzoni | 52/788 |
| 4,552,790 | 11/1985 | Francis | 428/34 |

FOREIGN PATENT DOCUMENTS 1245748 9/1971 United Kingdom ................. 52/235

Primary Examiner—Henry L. Raduazo
Attorney, Agent, or Firm—Michael J. Striker

[57] ABSTRACT

A pane holder for increasing security of an outer pane inside a composite glass pane system that accommodates a holder element secured to a supporting structure. The pane holder is formed by offsetting the outer pane so that at least one surrounding peripheral edge of the outer pane has a step-shape cross-section. The holder element has a folded edge that mechanically grips the step-shape cross-section to secure the outer pane to the supporting structure.

17 Claims, 9 Drawing Sheets

PANE HOLDER IN ALL-GLASS FACADES

This is a continuation of application Ser. no. 075 119, filed July 20, 1987, now abandoned.

BACKGROUND OF THE INVENTION

The invention relates to a pane holder for hanging pane zones on a supporting structure in all-glass facades.

All-glass facade structures are known from the EPA 2,130,438. In these structures, the individual pane zones are made of insulating glass units which in cross-section consist in each case of two or more individual panes arranged at a distance from one another, with the inner panes being fixed to one another by spacers and hung on the facade supporting structure. The holders used in this known structure consist of angled sectional pieces, the ends of which on the one hand engage with their angled portions into the cross-section between two adjacent inner panes of the composite pane and on the other hand are fixed to the frame supporting structure. At the same time, the angled portions of the holders take up much of the weight of the whole pane zone. However, the weight of the outer panes of the facade structure is taken up exclusively by a bonded connection between the outer pane and the holder and also possible spacers provided between adjacent insulating glass panes.

Since the relatively heavy all-glass facades are subjected in practice to high mechanical stresses, for example caused by vibrations and expansion and also by the effect of ultra-violet rays, it is unavoidable in the long term that the pane located in each case on the outside becomes loose on account of the high shearing forces acting between the individual panes on the bonded connection relative to the holder. In addition, since all-glass facades are as a rule hung perpendicularly on a building, thus causing the dead weight of each individual pane to come fully to bear, facade structures constructed in this manner create a high risk of causing an accident.

SUMMARY OF THE INVENTION

It is an object of the invention to avoid the disadvantages of the prior art and to propose a composite pane system which provides protection against accidents and in which all panes, including the outer pane, can be mechanically fixed via a holder to the facade supporting structure without this fixing visually spoiling the overall appearance of the all-glass facade.

This is achieved according to the invention in that, for accommodating the holder, at least one of the surrounding marginal edges of the outer pane of each pane zone is offset in a step shape in cross-section. This makes it possible to utilize the steps for the holders to grip from behind and also to mechanically secure the respective outer pane of a pane zone. As a result of the proposal according to the invention, securing the outer pane no longer depends entirely on the bonding forces between the individual panes and the spacers; the adhesive bond already present is also mechanically supported so that it is impossible in practice for the outer pane to fall out of the frame structure even under high alternating stresses and consequently an accident hazard is reliably avoided.

Each pane zone preferably consists of a multilayer laminated glass pane, and the step grips one or more of the laminated glass pane layers facing towards the outside of the facade. As is known, laminated glass panes are characterized by a high strength, because the individual layers of a stack of laminated panes are bonded to one another over their whole surface, and do not, as in the known insulating glass units, have a bonded connection which is effective only in the area of the spacers or other holders.

As an alternative to this, each pane zone can also consist of a single layer, commercially available pane, and the step grips a partial cross-section facing towards the outside of the facade.

In a preferred further development of the invention, it is proposed that each pane zone consists of an insulating glass unit comprising at least two individual panes arranged at a distance from one another, with the outer pane being a laminated glass pane or a single-layer pane which has the step. In this way, the invention can likewise be used in insulated all-glass facades.

If the all-glass facade only consists of two pane zones arranged next to one another, it is proposed to provide the steps at in each case two marginal edges of a pane zone which run parallel to one another. On the other hand, if an individual pane zone is enclosed on all four sides by pane zones, it is expedient to have the steps run round on all four marginal edges of a frame zone.

The distance between two adjacent marginal edges of the outer panes of two pane zones arranged next to one another, which outer panes have the steps, is preferably greater than the distance between the outer-pane marginal edges which face towards the inside of the facade and are free of steps.

The holder expediently consists of a single-part or multi-part sectional piece which in each case has an outer folded edge, for gripping behind the step at the outer pane, and a center web for fixing to the supporting structure.

The center web advantageously extends transversely to the longitudinal plane of a pane zone and bears against the allocated peripheral margin of each pane zone, whereas the outer folded edge runs essentially parallel to the plane of the pane. The folded edge of the holder is expediently narrower in cross-section than the height of the outer-pane step accommodating it. Thus the gap remaining can be covered in suitable manner by the outside of the facade. In a further development of the invention, the holder consists of a two-leg sectional bridge which is in one piece in cross-section and the free leg ends of which have the folded edges, with the sectional bridge being screwed to the supporting structure. The holder can be made in one piece such that it covers the edge length of each pane zone. But it can also consist of several parts arranged at a distance from one another along the edge length of each pane zone.

The holder is preferably made elastic so that any elongation within a fixing gap of two adjacent pane zones can easily be absorbed. The holder can be made of metal, or expediently of a material which is a poor conductor of heat, especially when the all-glass facade is to be of heat-insulating design.

The gaps of the steps, which gaps accommodate the angled portions of the holders, are preferably closed by a cover cap or are covered with a sealing compound or the like. This can readily be achieved in the structure according to the invention, because after the holders are arranged in the area of the steps sufficient space remains to cover or fill from the outside the gap formed by the step.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
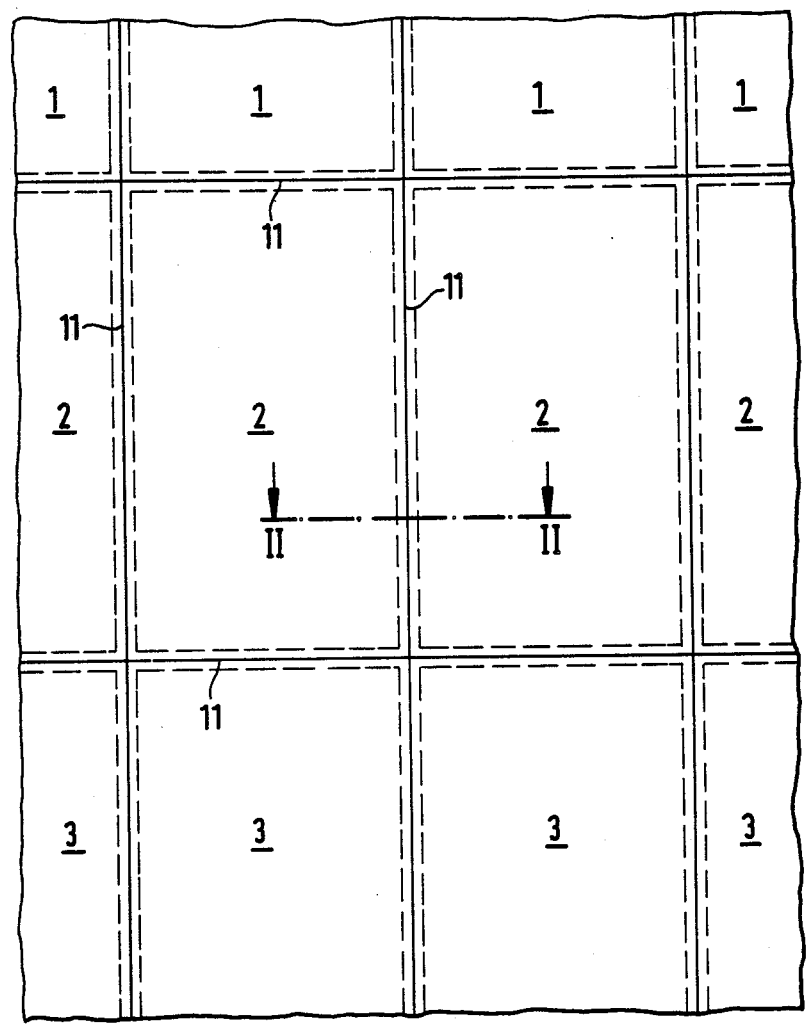
FIG. 1 shows a front view of a detail of an all-glass facade with several pane zones.
Figure 2:
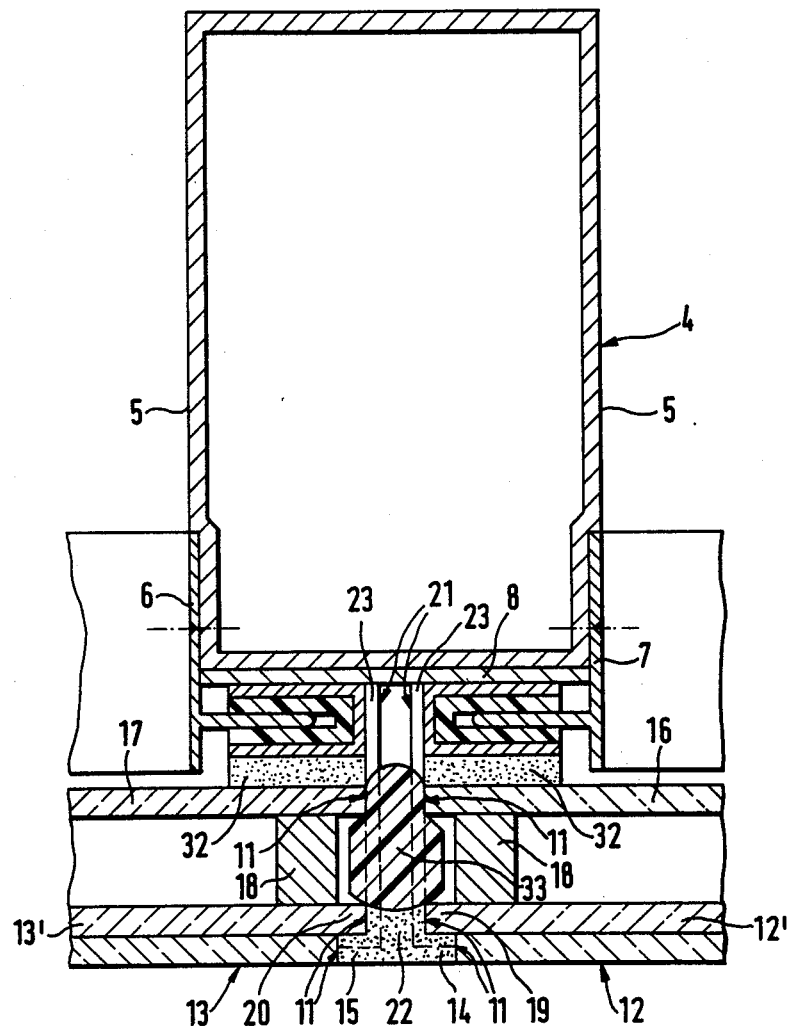
FIG. 2 shows a cross-section along line II—II in FIG. 1 in the area of an extruded metal upright section and with holders consisting of several parts.
Figure 3:
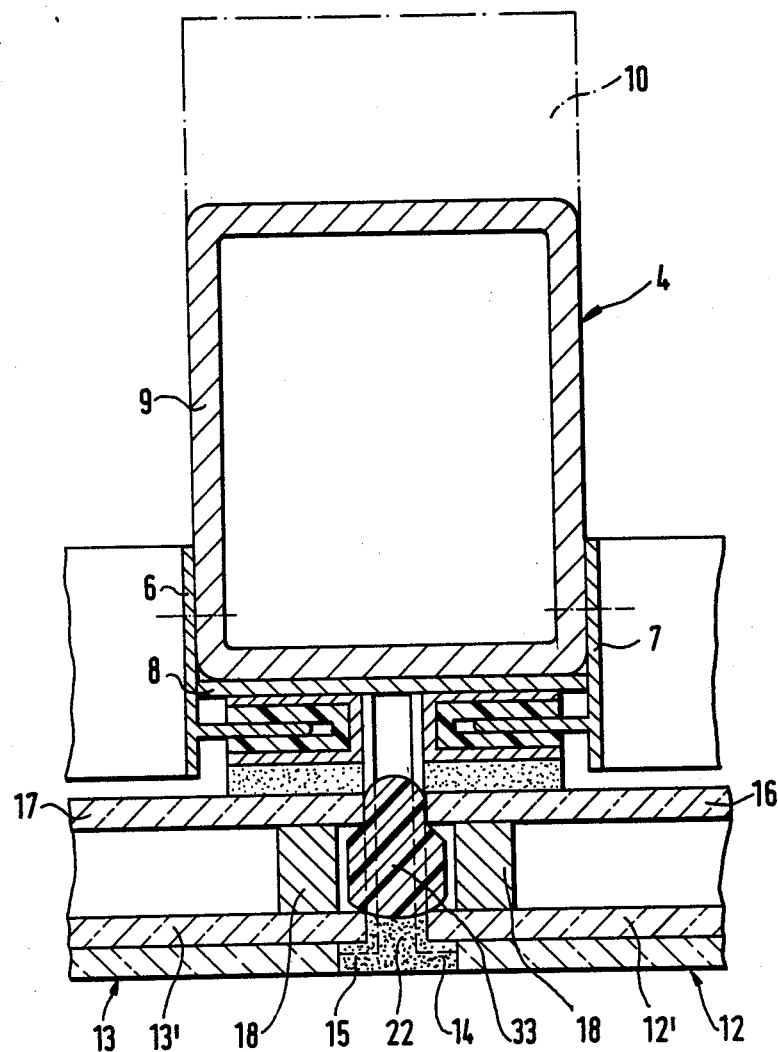
FIG. 3 shows a cross-section according to FIG. 2 but with a modified upright supporting structure.

The detail shown in FIG. 1 of an all-glass facade has individual glass pane zones 1, 2 and 3 which are arranged next to one another and above one another in a common plane within the overall zone and are fixed at their rear to a facade supporting structure 4. The facade supporting structure essentially consists of individual upright sections 5 as well as auxiliary sections 6, 7 and 8. Instead of the metal upright sections 5, any other type of fixing can be used for the supporting structure, for example steel casements 9 or a wooden casement 10 as follows schematically from FIG. 3.

Each pane zone has marginal regions 11 on all sides and also an outer pane 12 and 13 which according to the invention is offset in a step shape in cross-section at least at one of its surrounding marginal edges 11. In the examples shown, the steps are designated as 14 and 15. The individual pane zones have at least two individual panes 16 and 17, which are arranged at a distance from the outer panes 12 and 13, form the inner panes facing towards the facade supporting structure and comprise, together with the outer panes, an insulating glass unit. The outer panes 12 and 13 and the inner panes 16 and 17 are bonded to one another in known manner via spacers 18.

Figure 8:
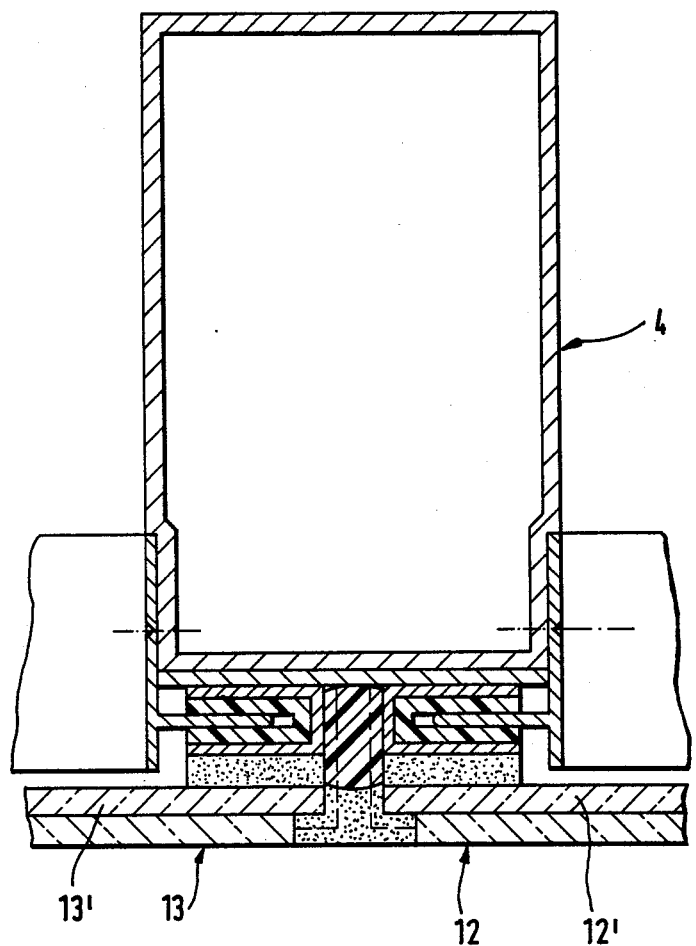
FIG. 8 shows a cross-section through a facade structure in which the pane zone simply consists of an individual multi-layer laminated glass pane.
Figure 9:
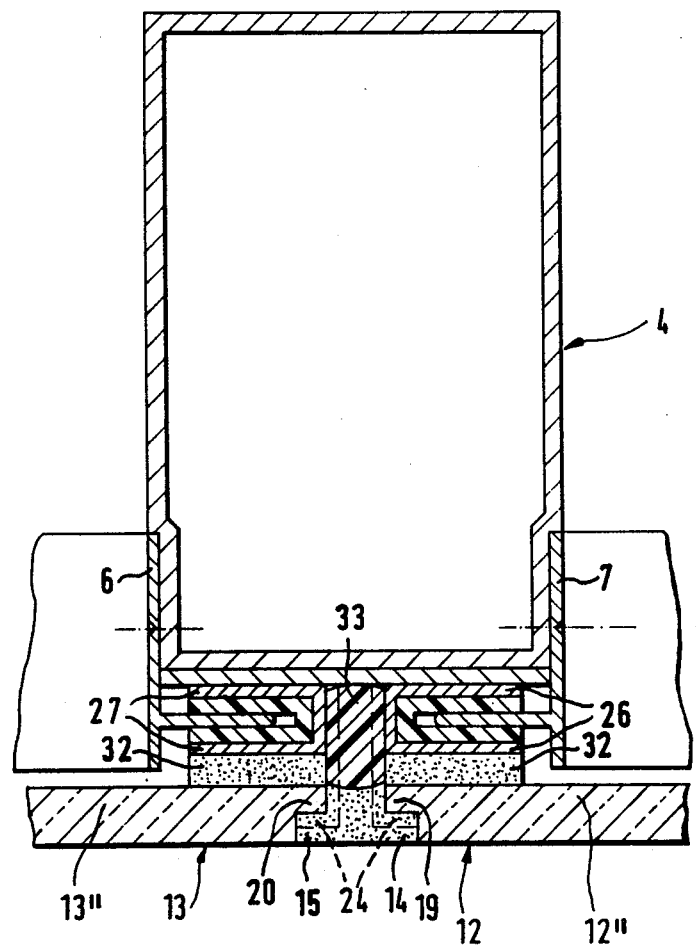
FIG. 9 shows a cross-section similar to FIG. 8 in which a commercially available single-layer glass pane is used instead of a laminated glass pane.

However, an all-glass facade structure according to the invention need not necessarily consist of insulating glass units; it is also possible to omit the inner panes 16 and 17, as can be seen from FIGS. 8 and 9. In this case, the outer panes 12 and 13 consist of a preferably multi-layer laminated glass pane (FIG. 8) which as is known permits high mechanical stresses. Instead of a laminated glass pane, a commercially available single pane (FIG. 9) can also be used provided it has sufficiently high strength and other material properties which enable the peripheral edges to be worked to form the steps 14 and 15 without there being the risk of panes breaking under subsequent mechanical loading of the peripheral edges in a ready-assembled pane zone. It is important that the steps 14 and 15 are each arranged on the outside of each outer pane so that projections 19 and 20 remain on the inside which can be gripped from behind by a holder 21 and can also be mechanically loaded. The steps are provided at the two vertical marginal edges 11, running parallel to one another, of each pane zone when further pane zones are laterally coupled to a center pane zone. On the other hand, if a single pane zone is enclosed all around by adjacent pane zones, as shown in FIG. 1, the steps also run round at all four marginal edges. The arrangement of the steps is selected such that the distance between the two adjacent projections 19 and 20 of each frame zone is smaller than the distance between the crosssectional marginal areas having the steps 14 and 15, so that there is sufficient space in the gap 22 thus formed to accommodate and arrange the holders 21.

Figure 4:
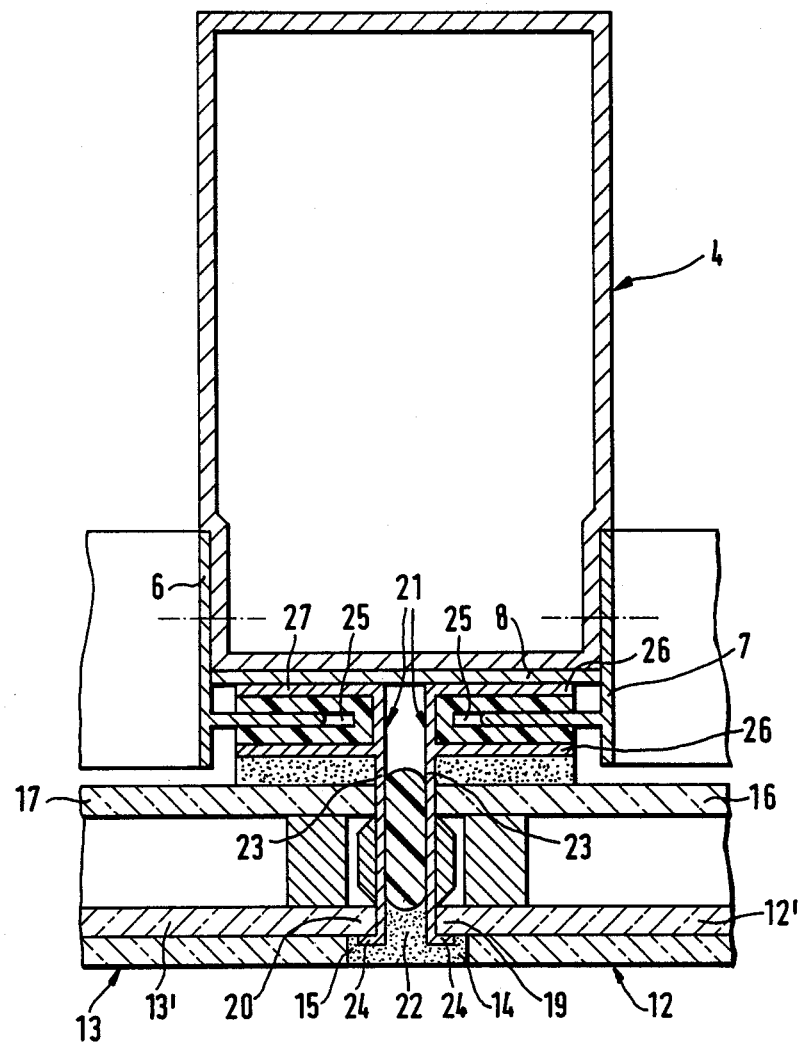
FIG. 4 shows a cross-section according to FIG. 2 with holder sections covering the length of the pane margins.
Figure 5:
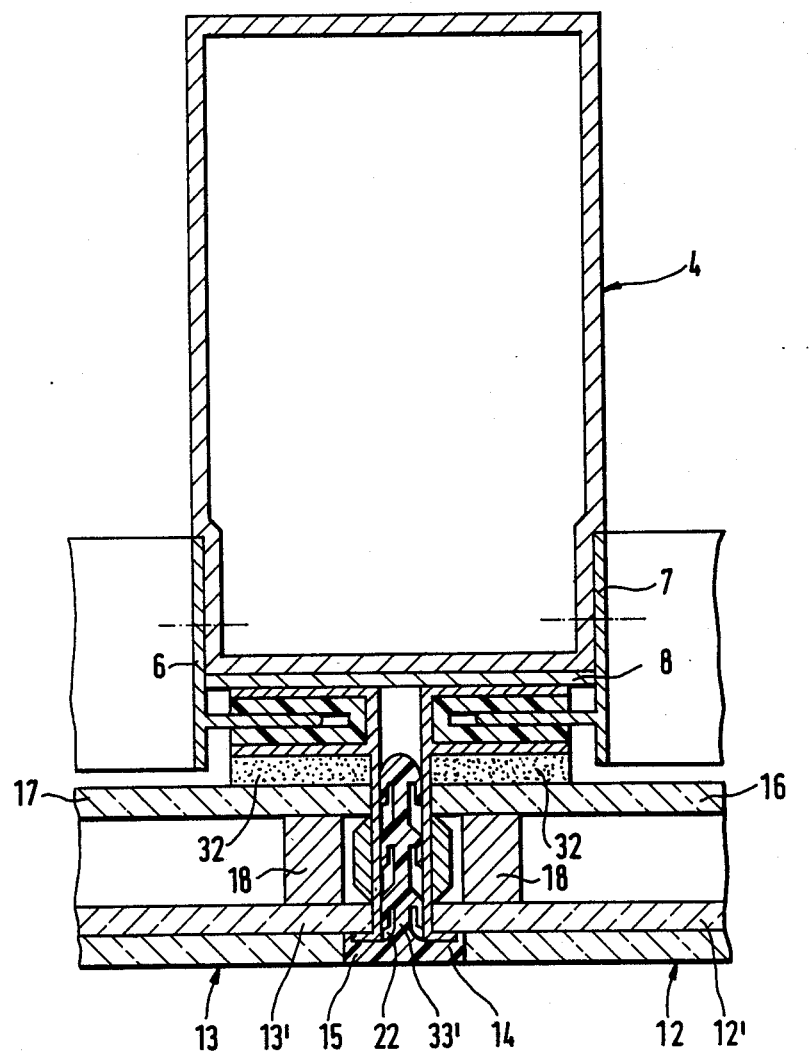
FIG. 5 shows a cross-section according to FIG. 4 in which the gap between two pane zones is filled with a rubber section.
Figure 6:
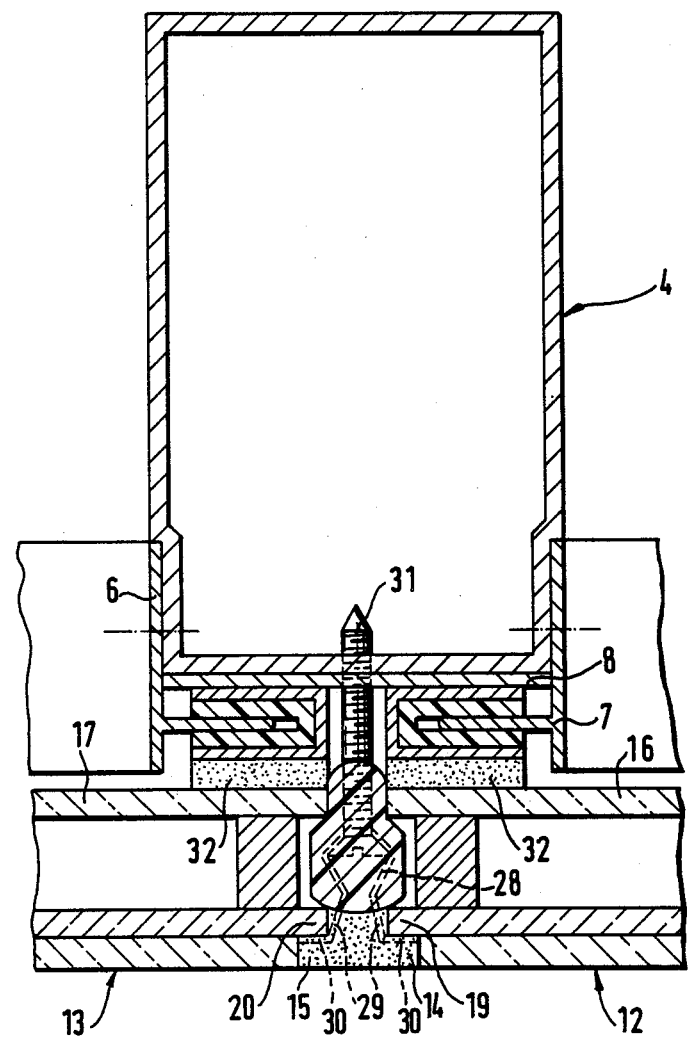
FIG. 6 shows a cross-section according to FIG. 5 but with a modified holder part consisting of short pieces.

The holders 21 each consist of individual sectional strips 23, each of which has an outer folded edge 24 which in cross-section is narrower than the height of the step 14 and 15 and grips behind the projections 19 and 20 of the outer panes 12 and 13. The folded edges 24 are located at the ends of a center web of the sectional strip 23, which center web extends transversely to the longitudinal plane of each pane zone and bears against the peripheral margins. At center-web ends remote from their folded edges 24, the holders 21 each have sectional webs 26 and 27 which define a groove 25, serve to accommodate and fix the auxiliary sections 6 and 7 and extend essentially parallel to the plane of the pane. The sectional strips 23 can be made as continuous strips which run uninterrupted around the pane margins (FIGS. 2, 3, 4, 5, 7), but can also consist of serveral short pieces arranged at a distance from one another at the margins of the pane zones (FIGS. 6, 8, 9). In the cross-sections of the figures, the short pieces are each shown in broken lines. The sectional strips 23 can either be made in one piece with the U-sections 26 and 27 (FIGS. 4, 5) or can, for example, be screwed, welded or connected in some other manner as separate sectional lengths to the U-sections 26 and 27 (FIGS. 2, 3, 8, 9).

Figure 7:
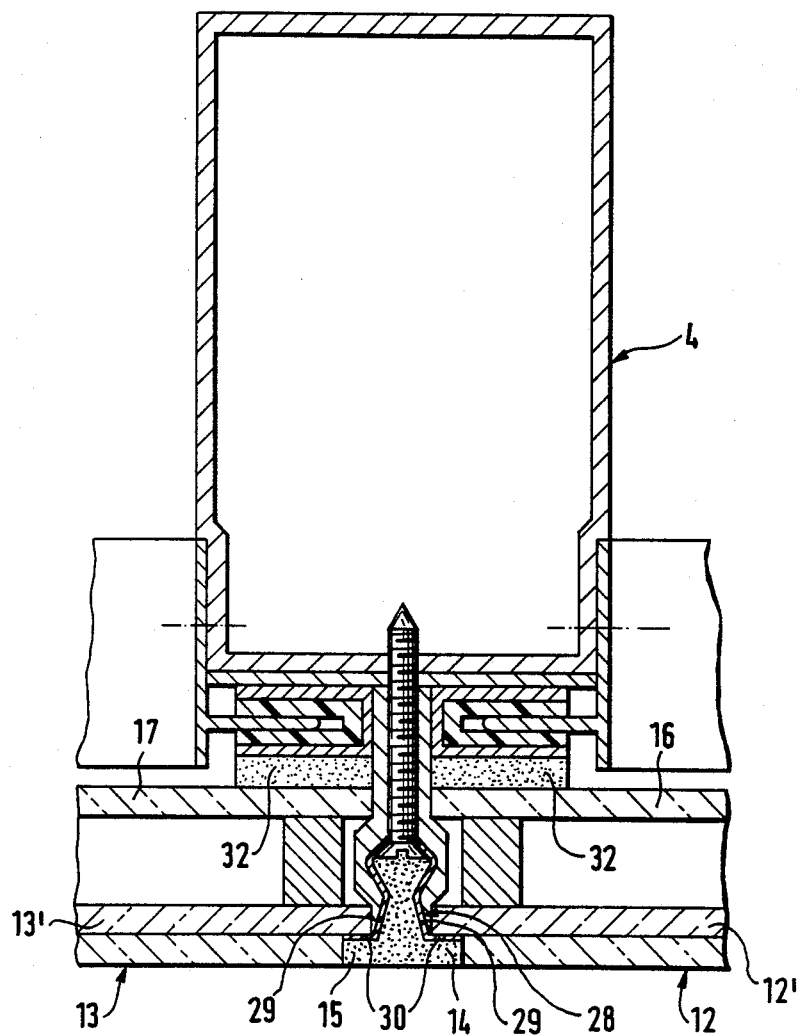
FIG. 7 shows a cross-section according to FIG. 6 with a holder part covering the edge length of the pane zones.

The holders 21, instead of being designed as described above, can also be modified in form, as can be seen from FIGS. 6 and 7. The holders 28 shown in these figures each consist of a sectional bridge which is in one piece in cross-section and has two elastic legs 29 of equal length, on the outer free end of which are located folded edges 30 which correspond to the folded edges 24 in the first examples described previously. In the base of the sectional bridge is located a hole through which a screw 31 passes which is screwed directly into the supporting structure 4. The sectional bridges can also cover the marginal lengths of the pane zones (FIG. 7) or be made as short pieces (FIG. 6). Depending on the intended application, metal or a material which is a poor conductor of heat, for example plastic, is used as the material for the holders 21 and 28.

For assembly, the individual pane zones are first of all made up, that is, cut to size, and the outer panes 12 and 13 are bonded to the inner panes 16 and 17 via the spacers 18. The holders 21 are then placed onto the marginal area of each pane zone such that their centre webs 23 run at right-angles to the longitudinal plane of the pane, whereas the folded edges 24 grip in closely fitting manner behind the projections 19 and 20 of the inner laminated glass pane layers 12' and 13' of the outer panes 12 and 13, which inner layers 12' and 13' face towards the inside of the facade. In the example according to FIG. 9, the inner layers 12' and 13' of the laminated glass panes correspond to the inner cross-sectional areas 12" and 13" of the single pane.

The holders 21 are fixed in position by the U-leg 26 and 27 of the holder being additionally bonded to the inner panes 16 and 17 respectively at 32, which U-leg 26 and 27 in each case faces towards the pane 16 and 17 respectively. In this way, the respective outer panes 12 and 13 and the inner panes 16 and 17 of each pane zone are enclosed between the folded edges 24 and 30 and the sectional webs 26 and 27 and are additionally bonded so that each pane zone is in absolutely fixed combination.

In the modified example according to FIGS. 6 and 7, in which sectional bridges 28 are inserted as a holder, assembly is effected in similar manner. Here, two individual pane zones are likewise first of all placed in each case next to one another at a distance, then the sectional bridge 28 is inserted such that the folded edges 30 grip behind the projections 19 and 20, and the pane zones are then finally locked in a position on the supporting structure 4 via the screw 31 and the bonded joint 32. The U-section provided in each case on the inside of the inner panes 16 and 17 essentially corresponds to the sectional portions of the holder 21 in the example according to FIGS. 2 to 5, which sectional portions have the legs 26 and 27. These sectional portions are likewise fixed to the inner panes by bonded layers 32 or the like and therefore additionally stabilize the complete composite structure of the facade.

Finally, the gaps 22 formed in each case between two pane zones are closed, for example, by a blanking strip 33 (FIG. 2) and after final assembly all other external visible gaps remaining are sealed with a silicone compound. Because the spacing gap 22 can in each case be sealed from the outside and the folded edges of the holders therefore cannot be seen, the structure according to the invention presents a pleasant appearance from the outside. Instead of the silicone compound, any suitable material can of course be used for filling the gaps, such as, for example, a cover cap 33' (FIG. 5) of rubber of the like. The pane zones in the examples according to FIGS. 8 and 9 are assembled in corresponding manner, since in these examples only the inner panes 16 and 17 with the spacers 18, which are normal in conventional insulating glass units, are omitted.

It will be understood that each of the elements described above, or two or more together, may also find a useful application in other types of constructions differing from the types described above.

While the invention has been illustrated and described as embodied in a pane holder for all-glass facades, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A glass supporting system in all-glass facades, comprising:
a supporting structure;
a holder element composed of a heat-resistant material and to be secured to said supporting structure, said holder element having a center web portion fixable to said supporting structure, said holder element also having an outer folded edge portion; and a plurality of glass pane zones located forwardly of said supporting structure and each having at least one straight outer pane with a plurality of surrounding peripheral edges defining an outside of the facade, said outer pane having means for accommodating said holder element, said accommodating means being formed by at least one of said surrounding peripheral edges having a step-shape cross-section defining a step provided in said outer pane and having a predetermined height, said folded edge portion of said holder element extending substantially parallel to a plane of said one outer pane and having a thickness which is smaller than said height of said step, said folded edge portion gripping in said step of said one outer pane from outside and not projecting outwardly beyond an outer surface of said one outer pane, so as to mechanically secure said one outer pane by said holder element, said step having an inner portion and an outer portion formed so that said outer portion is wider than said inner portion.

2. The system as defined in claim 1, wherein each of said pane zones has multi-layers of laminated glass panes, at least one of said multi-layers having said step-shape cross-section facing toward the outside of the facade.

3. The system as defined in claim 1, wherein each of said pane zones has a single-layer pane having a partial cross-section facing toward the outside of the facade which is said step-shape cross-section.

4. The system as defined in claim 1, wherein each of said pane zones has an insulating glass unit, said glass unit including at least two individual panes spaced apart from each other, an outer one of said two individual panes forming said step-shape cross-section.

5. The system as defined in claim 4, wherein said outer one of said two individual panes is composed of laminated glass pane.

6. The system as defined in claim 4, wherein said outer one of said two individual panes is composed of a single-layer glass pane.

7. The system as defined in claim 1, wherein said plurality of surrounding peripheral edges has a second edge that runs parallel to said at least one of said peripheral edges, said second edge being formed offset with a step-shape cross-section.

8. The system as defined in claim 1, wherein said plurality of surrounding peripheral edges has four edges each being offset with a step-shape cross-section that runs around all four of said plurality of surrounding peripheral edges.

9. The system as defined in claim 1, wherein said holder element is formed of a plurality of members spaced at a predetermined distance from each other along one of said surrounding peripheral edges of each of said pane zones.

10. The system as defined in claim 1, wherein said holder element is composed of elastic material.

11. The system as defined in claim 1, wherein said holder element is composed of metal.

12. The system as defined in claim 1, wherein said holder element is composed of a poor heat conductor.

13. The system as defined in claim 9, wherein said two adjacent outer panes define a gap therebetween; and further comprising means for closing said gap.

14. The system as defined in claim 20, wherein said closing means includes a sealing compound.

15. The system as defined in claim 20, wherein said closing means includes a cover cap.

16. The system as defined in claim 1, wherein each of said pane zones has an edge length, said holder element being formed in one piece and covering said edge length of at least one of said pane zones.

17. A a glass supporting system in all-glass facades, comprising: a supporting structure; a holder element composed of a heat-resistant material and to be secured to said supporting structure, said holder element having a center web portion fixable to said supporting structure, said holder element also having an outer folded edge portion; and a plurality of glass pane zones located forwardly of said supporting structure and each having at least one straight outer pane with a plurality of surrounding peripheral edges defining an outside of the facade, said outer pane having means for accommodating said holder element, said accommodating means being formed by at least one of said surrounding peripheral edges having a step-shape cross-section defining a step provided in said one outer pane, and said folded edge portion of said holder element gripping in said step of said outer pane from outside and not projecting outwardly beyond an outer surface of said one outer pane, so as to mechanically secure said one outer pane by said holder element, said plurality of glass pane zones each having at least two glass panes, outer panes of each of said at least two glass panes being arranged adjacent to each other to constitute two adjacent outer panes, said two adjacent ouer panes having one of said surrounding peripheral edges adjacent to each other so as to constitute adjacent peripheral edges, said adjacent peripheral edges each having an inner portion and an outer portion, said outer portion having said stepshape cross-section, said inner portion of each of said adjacent peripheral edges being spaced apart from each other to define an inner distance free of said step-shape crosssection, said outer portion of each of said adjacent peripheral edges being spaced apart to define an outer distance greater than said inner distance.

* * * * *